(12) United States Patent
Liu

(10) Patent No.: US 7,815,412 B2
(45) Date of Patent: Oct. 19, 2010

(54) SUBSTRATE DISTRIBUTION METHOD

(75) Inventor: Kai-Yu Liu, Taichung County (TW)

(73) Assignee: AU Optronics, Corp., Hsinchu (TW)

( * ) Notice: Subject to any disclaimer, the term of this patent is extended or adjusted under 35 U.S.C. 154(b) by 56 days.

(21) Appl. No.: 12/216,842

(22) Filed: Jul. 11, 2008

(65) Prior Publication Data

US 2008/0273960 A1    Nov. 6, 2008

Related U.S. Application Data

(62) Division of application No. 11/025,925, filed on Jan. 3, 2005, now Pat. No. 7,431,551.

(30) Foreign Application Priority Data

Jul. 26, 2004    (TW)    ............... 93122337 A

(51) Int. Cl.
C03B 5/24    (2006.01)
(52) U.S. Cl. ..................................... 414/810
(58) Field of Classification Search ............ 414/416.08, 414/810
See application file for complete search history.

(56) References Cited

U.S. PATENT DOCUMENTS

| | | | |
|---|---|---|---|
| 4,759,681 A * | 7/1988 | Nogami | ................. 414/416.03 |
| 4,900,212 A * | 2/1990 | Mikahara | ................. 414/416.03 |
| 5,501,564 A * | 3/1996 | Doche | .................... 414/331.13 |
| 5,544,734 A | 8/1996 | Gebhardt | |
| 5,577,621 A | 11/1996 | Yi | |
| 5,850,071 A | 12/1998 | Makiguchi et al. | |
| 6,230,872 B1 | 5/2001 | Huang et al. | |
| 6,236,021 B1 | 5/2001 | Fair et al. | |
| 6,273,275 B1 | 8/2001 | Kim et al. | |
| 6,315,028 B1 | 11/2001 | Inoue | |
| 6,749,072 B2 | 6/2004 | Takano et al. | |
| 6,817,821 B2 * | 11/2004 | Henderson et al. | ........... 414/159 |
| 2002/0121424 A1* | 9/2002 | Miyake | .................... 198/468.8 |
| 2003/0168313 A1* | 9/2003 | Hiroki | ..................... 198/369.6 |
| 2005/0115773 A1* | 6/2005 | Cho et al. | ..................... 187/251 |
| 2007/0020067 A1* | 1/2007 | Lin et al. | ................. 414/331.09 |

* cited by examiner

*Primary Examiner*—Charles A Fox
(74) *Attorney, Agent, or Firm*—Bacon & Thomas, PLLC

(57) ABSTRACT

A glass substrate distribution system includes a cassette, a first transmission mechanism, and a second transmission mechanism. The first transmission mechanism transmits the glass substrate to several standby positions outside the cassette. The second transmission mechanism transmits the glass substrate between the standby positions and the glass substrate.

5 Claims, 6 Drawing Sheets

SUBSTRATE DISTRIBUTION METHOD

This application is a divisional application of pending U.S. patent application Ser. No. 11/025,925, filed Jan. 3, 2005, now U.S. Pat. No. 7,431,551, now-allowed (of which the entire disclosure of the pending, prior application is hereby incorporated by reference).

BACKGROUND OF THE INVENTION

1. Field of the Invention

The invention relates in general to a distribution system and a method thereof, and more particularly to a substrate distribution system and method.

2. Description of the Related Art

The glass substrate is an essential component to the Liquid Crystal Display (LCD). There are various LCD with different specifications in the marketplace. As it should be, providing a cassette having receiving areas of different size to contain the glass substrate of different size is indispensable during production. Conventionally, a wire cassette is used to receive glass substrates.

Referring to FIGS. 1A and 1B, a front view and a transparent top view of a conventional glass substrate access device 100 are shown respectively. The glass substrate access device 100 includes a wire cassette and rollers 140. The wire cassette includes a roof 102, a base 103, two side walls 105, and spacers 120. The roof 102, the base 103, and the two side walls 105 define a space. The spacers 120 are disposed on the inner surface of the two side walls 105, for spacing the space into several substrate receiving areas 150, each of which receives one glass substrate. The wire cassette includes several parallel wires 122 arranged in the substrate receiving areas 150. As shown in FIG. 1B, both of the glass substrates 166 and 164 can be transmitted into the wire cassette by the rollers 140 and then supported by several wires 122 in the substrate receiving area 150. However, the distance between two rows of rollers 140 is fixed. Any glass substrate with a width smaller than that distance fails to be transmitted into the wire cassette by the rollers 140, thereby decreasing the storage capacity. Further, the conventional rollers transmit single glass substrate each time the rollers rotate for accessing the glass substrate.

SUMMARY OF THE INVENTION

It is therefore an object of the invention to provide a glass substrate distribution system and method to increase the storage capacity of the cassette for receiving small glass substrates and to enhance the storage efficiency, thereby lowering the manufacturing cost of the glass substrate.

The invention achieves the above-identified object by providing a glass substrate distribution system. The system includes a cassette, a first transmission mechanism, and a second transmission mechanism. The first transmission mechanism is disposed outside the cassette, for transmitting the glass substrate to several standby positions outside the cassette. The second transmission mechanism transmits the glass substrate between the standby positions and the cassette.

The invention achieves the above-identified object by providing a glass substrate distribution method. The glass substrate distribution method includes the following steps. A cassette is first provided. The glass substrate is then carried to several standby positions. After that, the glass substrate is transmitted into the cassette from the standby positions to the glass cassette.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
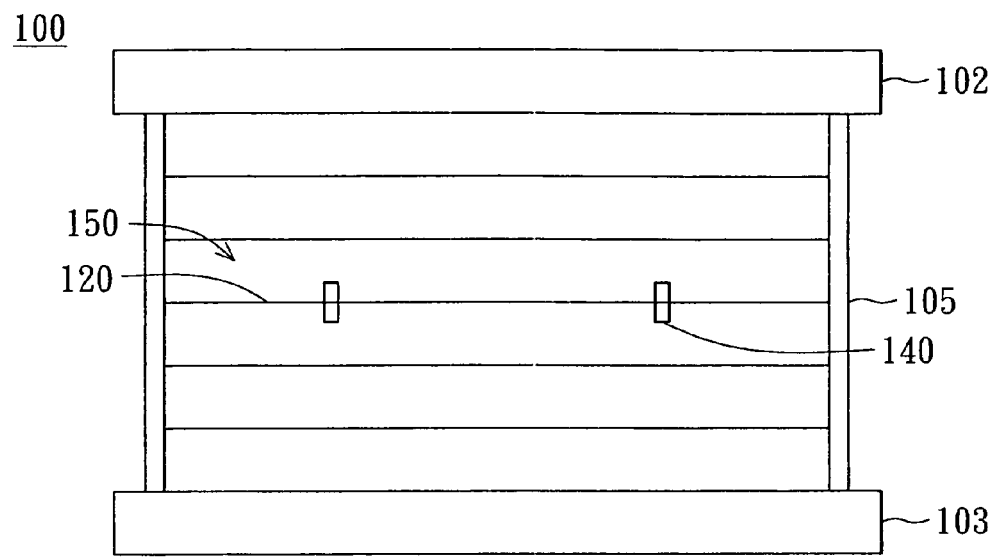
FIG. 1A (Prior Art) is a front view of a conventional glass substrate access device.
Figure 1B:
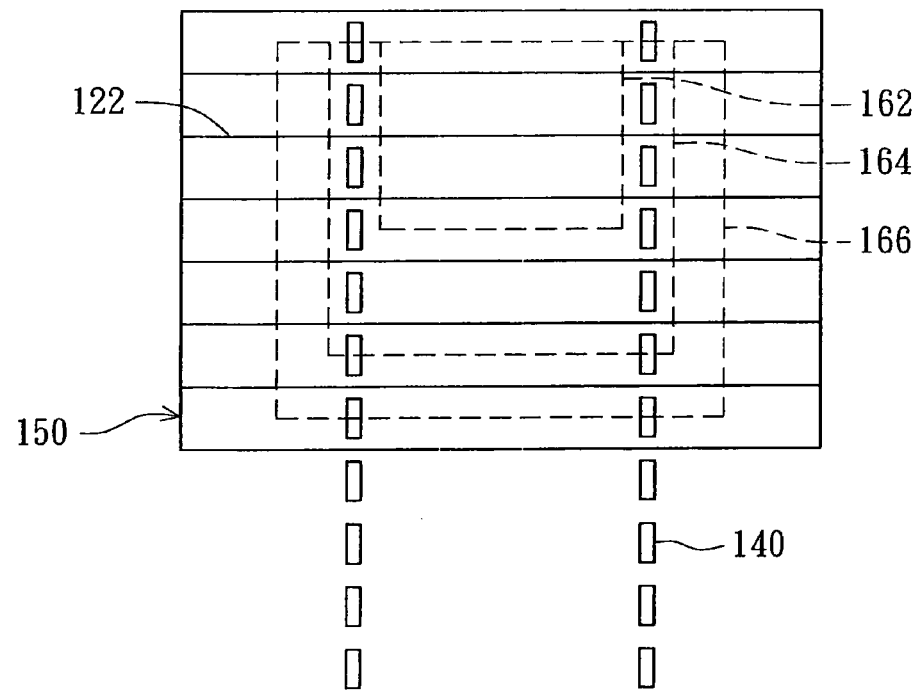
FIG. 1B (Prior Art) is a transparent top view of the glass substrate access device in FIG. 1A.
Figure 2A:
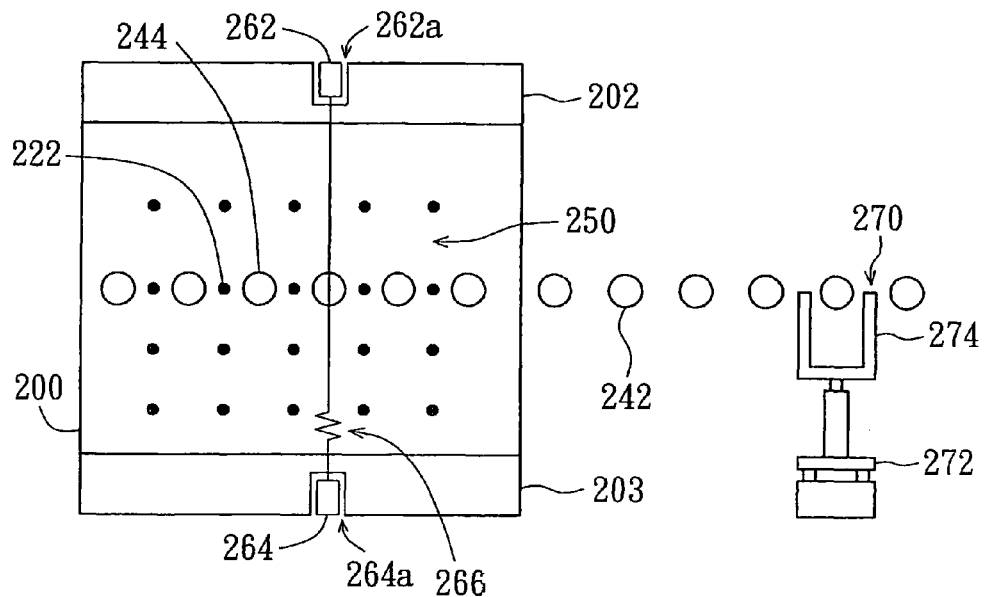
FIG. 2A is cross-sectional side view of a glass substrate distribution system according to a preferred embodiment of the invention.
Figure 2B:
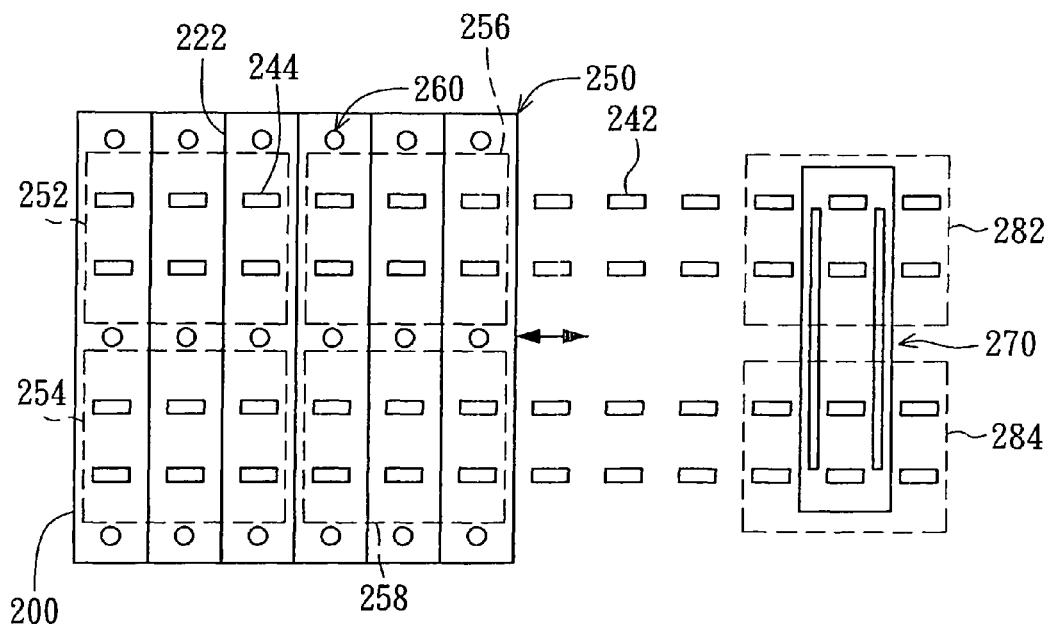
FIG. 2B is a transparent top view of the glass substrate distribution system in FIG. 2A.

Referring to FIGS. 2A and 2B, FIG. 2A is a cross-sectional side view of a glass substrate distribution system according to a preferred embodiment of the invention and FIG. 2B is a transparent top view of the glass substrate distribution system in FIG. 2A. The glass substrate distribution system includes a cassette 200, a first transmission mechanism 270, and a second transmission mechanism. The cassette 200 has at least one substrate receiving area 250. The cassette 200 includes a roof 202, a base 203, two side walls, and spacers. The roof 202, the base 203, and the two side walls define a space. The spacers are disposed on the inner surface of the two side walls, for spacing the space into several substrate receiving areas 250, each of which receives one glass substrate. As shown in FIGS. 2A and 2B, the cassette includes a partition structure 260, and several adjacent supports 222. The adjacent supports 222 disposed in each substrate receiving area 250 are parallel with one another, for upholding the glass substrate.

Figure 2C:
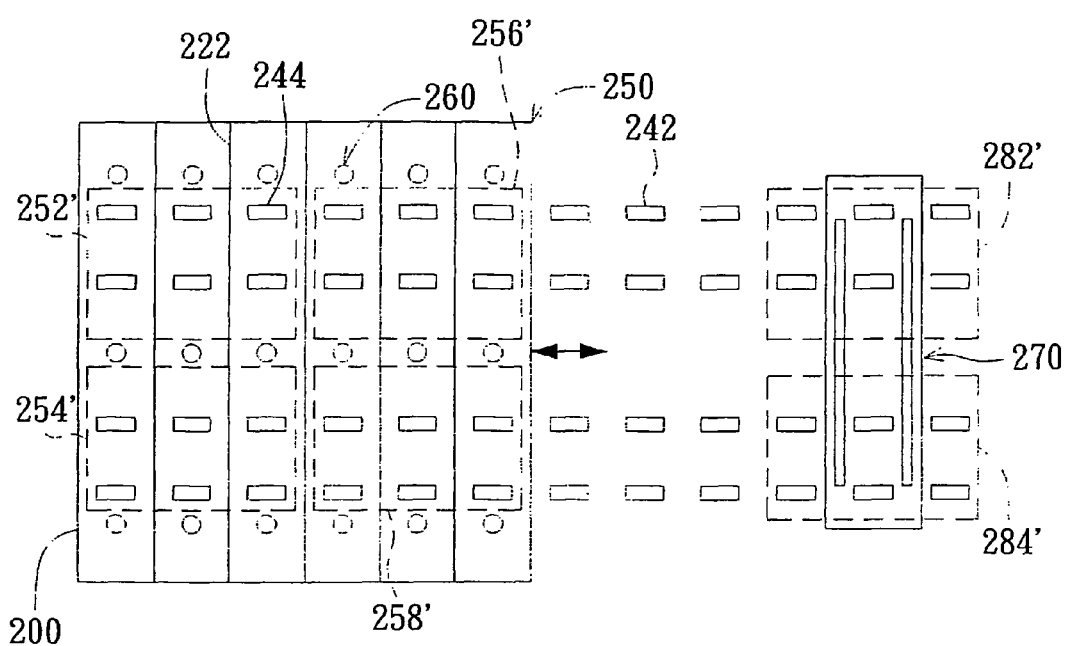

The partition structure 260 is disposed at the cassette 200, for partitioning each substrate receiving area 250 into several storing spaces. As shown in FIG. 2A, the partition structure 260 includes a fixer, and an adjusting component 266. The fixer is used to affix the partition structure 260 to an upper hole 262a and a lower hole 264a in the cassette 200. The fixer includes an upper block 262 and a lower block 264, which are movably disposed in the upper hole 262a and the lower hole 264a respectively along a direction perpendicular to the moving direction of the substrate. The adjusting component 266 is for adjusting the position of the upper block relative to the upper hole and the position of the lower block relative to the lower hole. The adjusting component preferably is a spring for connecting the upper block 262 and the lower block 264. As shown in FIG. 2B, the partition structure 260 partitions one substrate receiving area 250 into two areas, which respectively provide the storing spaces 252 and 256 and the storing spaces 254 and 258. That is, the cassette 200 has four storing spaces 252, 254, 256 and 258. As shown in FIG. 2C, the partition structure 260 partitions one substrate receiving an area 250 into two areas, which respectively provide the storing spaces 252' and 256' smaller than the storing spaces 252 and 256 and the storing spaces 254' and 258' smaller than the storing spaces 254 and 258. Further, the partition structure 260 can determine the number of the storing spaces according to the size of substrate. In particular, the partition structure 260 can multiply the storing spaces in the cassette 200 for receiving small glass substrates, thereby increasing the storage capacity of the cassette. Besides, the partition structure can easily adjust the size of the substrate receiving areas for receiving various sizes of the glass substrates to satisfy the actual need without disassemble and reassemble the cassette 200.

The second transmission mechanism can transmit the glass substrate into the cassette 200 from the standby positions 282 and 284 to the storing spaces 252, 254, 256 and 258 or transmit the glass substrate out of the cassette from the storing spaces 252, 254, 256 and 258 to the standby positions 282 and 284. The second transmission mechanism preferably is a roller set, which includes several inner rollers 244 and several outer rollers 242. The outer rollers 242 are aligned with the inner rollers 244. The inner rollers 244 are disposed between the supports 222 and higher than the supports 222. The inner rollers 244 are able to move upward and downward inside the cassette 200. As shown in FIG. 2B, the inner rollers 244 and the supports 222 are alternately arranged in the substrate receiving area 250. The outer rollers 242 are disposed outside the cassette 200 and adjacent to the first transmission mechanism 270. The first transmission mechanism 270 is disposed outside the cassette 200, for carrying the glass substrate to several standby positions outside the cassette 200. The first transmission mechanism 270 includes a shift means 272 and a lift means 274. The shift means 272 is for horizontally shifting the glass substrate among the standby positions 282 and 284 while the lift means 274 is for vertically uplifting the glass substrate above the outer rollers 242 or lowering the glass substrate onto the outer rollers 242.

Figure 3A:
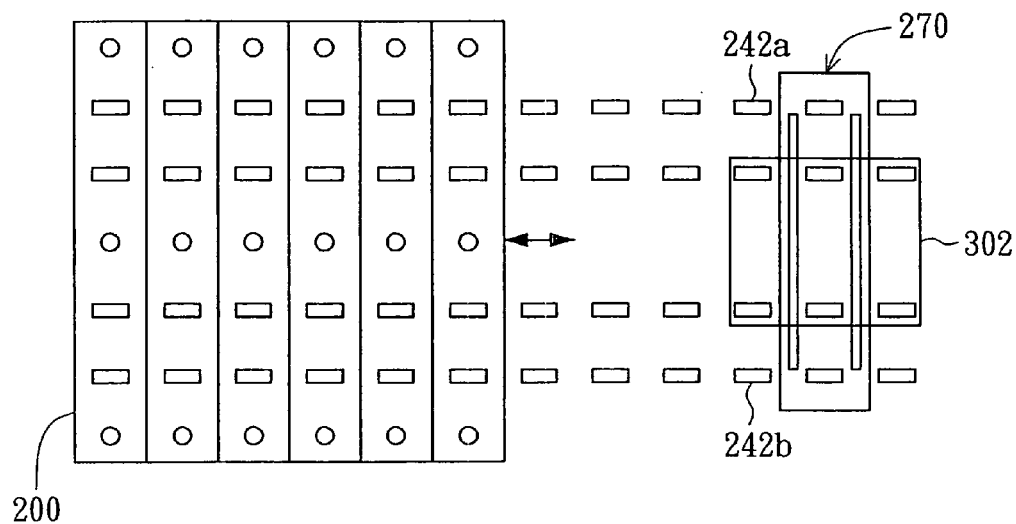
FIGS. 3A-3E show a glass substrate distribution method according to the preferred embodiment of the invention.
Figure 3B:
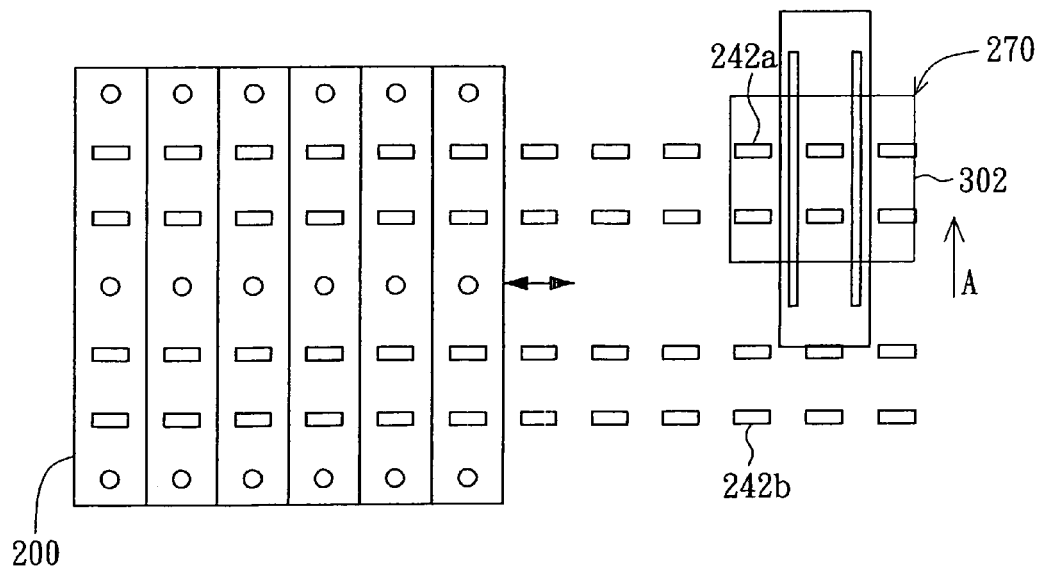
Figure 3C:
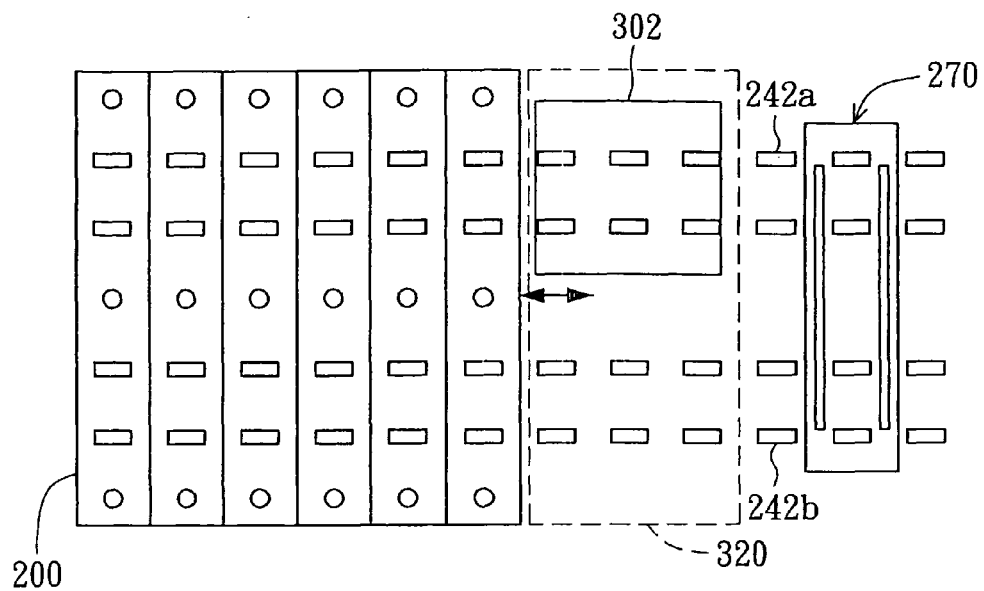
Figure 3D:
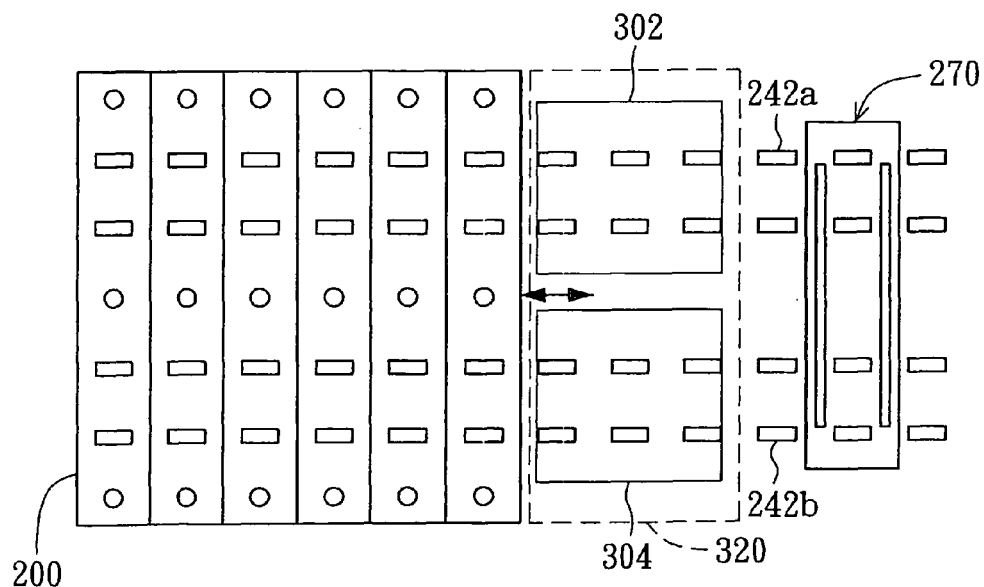
Figure 3E:
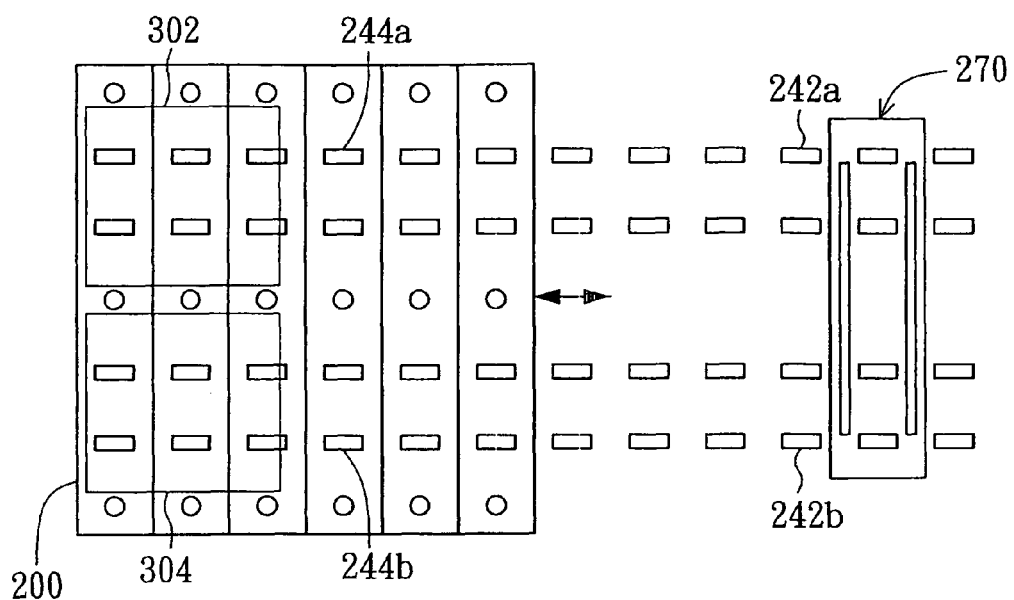

Please refer to FIGS. 3A to 3E, which shows a glass substrate distribution method according to the preferred embodiment of the invention; please also refer to FIGS. 2A and 2B. The glass substrate distribution method is applied to the glass substrate distribution system. The cassette 200 having several storing spaces is first provided. As shown in FIG. 3A, the glass substrate 302 is placed on the outer rollers 242. Then, in FIG. 3B, the first transmission mechanism 270 transmits the glass substrate 302 to the standby position 282 outside the cassette 200. The lift means 274 uplifts the glass substrate 302 above the outer rollers 242, and the shift means 272 shifts the glass substrate 302 above the standby position 282. After that, the lift means 274 lowers the glass substrate 302 onto the first outer rollers 242a corresponding to the standby position 282 for setting the glass substrate 302 on the standby position 282. The method according to the invention introduces the distribute transmission which means sequentially driving the first outer rollers 242a and the second outer rollers 242b before the glass substrates get into the cassette but simultaneously driving the roller set to transmit the glass substrates into the cassette. It is noted that the glass substrate can also be directly transmitted from the standby position to the storing spaces 252 or 256. As shown in FIG. 3C, only the first outer rollers 242a are driven to transmit the glass substrate 302 from the standby position 282 to the area 320. After that, the cassette 200 is moved upward and the inner roller is moved downward to receive the next substrate. Meanwhile, the first transmission mechanism 270 returns to the initial status for waiting the next glass substrate. Similarly, in FIG. 3D, another glass substrate 304 placed on the outer rollers 242 is carried to the standby position 284. Then, only the second outer rollers 242b are driven to transmit the glass substrate 304 from the standby position 284 to the area 320. As shown in FIG. 3D, two glass substrates 302 and 304 are transmitted to the area 320. At last, two glass substrates 302 and 304 in the area 320 are simultaneously and respectively transmitted to the storing spaces 252 and 254 by the first outer and inner rollers 242a and 244b and by the second outer and inner rollers 242b and 244b, as shown in FIG. 3E. The distribution transmission introduced by the invention can simultaneously transmit several glass substrates so as to enhance the storage efficiency, save time, and lower the manufacturing cost.

In FIG. 2B, the substrate receiving area 250 further provides the other two storing spaces 256 and 258. Therefore, the above-mentioned steps can be repeated to transmit the other two glass substrates (not shown in FIG. 2B) from the standby positions 282 and 284 to the storing spaces 256 and 258. It is understood that the above-mentioned steps can be reversed for transmitting the glass substrates out of the cassette from the storing spaces to the standby positions.

Moreover, as shown in FIG. 2A, the cassette is a multi-layer cassette having several substrate receiving areas, each of which is partitioned into several storing spaces. Thus, the multi-layer cassette is first positioned before starting the distribute method so that the first storing space of the first substrate receiving area levelly correspond to the standby positions for transmission. Then, the cassette is moved to reposition the cassette so that the second storing space levelly corresponds to the standby positions for further transmission.

The glass substrate distribute system and method according to the preferred embodiment of the invention has the special design of the partition structure, which can easily adjust the size of the substrate receiving areas for receiving various sizes of the glass substrates to satisfy the actual need. In particular, the partition structure can multiply the storing spaces in the cassette for receiving small glass substrates, thereby increasing the storage capacity of the cassette. The partition structure not only can adjust the storing spaces without disassemble and reassemble the cassette 200 but also determine the number of the storing spaces according to the size of substrate. Further, the distribution transmission introduced by the invention can simultaneously transmit several glass substrates so as to enhance the storage efficiency, save time, and lower the manufacturing cost. Besides, the invention can also be utilized with substrates other than glass, such as ITO substrates, plastic substrates or substrates with similar shape.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A substrate distribution method, comprising:
   (a) providing a cassette;
   (b) carrying a plurality of substrates to a plurality of standby positions;
   (c) transmitting the substrates from the standby positions to the cassette by a plurality of inner rollers inside the cassette and a plurality of outer rollers outside the cassette; and
   (d) moving the inner rollers downward to receive the next substrate.

2. The method according to claim 1, wherein the step (b) comprises:
   placing one of the substrates on the outer rollers corresponding to a position;
   uplifting the one substrate;
   shifting the one substrate above a standby position; and
   lowering the one substrate onto the outer rollers corresponding to the standby position.

3. The method according to claim 1, wherein the step (b) comprises:

placing a first substrate on the outer rollers corresponding to a first position;

shifting the first substrate to a first standby position;

placing a second substrate on the outer rollers corresponding to a second position;

shifting the second substrate to a second standby position; and simultaneously shifting the first and the second substrates at the first and the second standby positions to a first and a second storing spaces in the cassette.

4. The method according to claim 1, wherein before the step (b) further comprises partitioning the cassette into a plurality of storing spaces.

5. The method according to claim 1, wherein after the step (c) further comprises:

moving the cassette upward to receive the next substrate.

* * * * *